Oct. 22, 1940.  W. O. GANTZ  2,218,607
METHOD AND MEANS FOR CRACKING NUTS
Filed Aug. 29, 1938
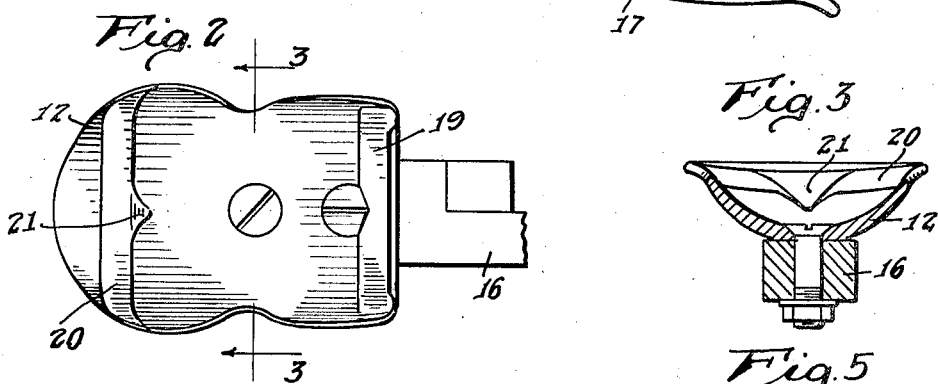
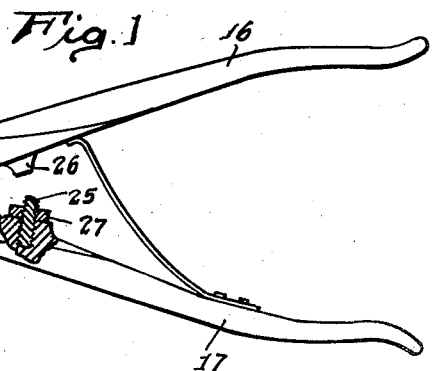
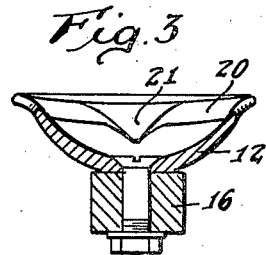
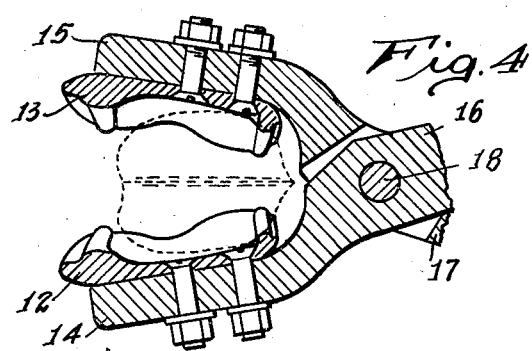
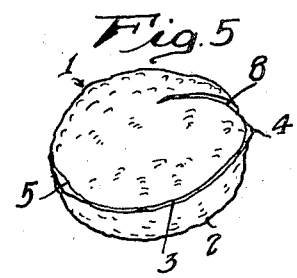
Inventor
William O. Gantz
By Lyon & Lyon
Attorneys Patented Oct. 22, 1940

2,218,607

UNITED STATES PATENT OFFICE 2,218,607

METHOD AND MEANS FOR CRACKING NUTS

William O. Gantz, Los Angeles, Calif.

Application August 29, 1938, Serial No. 227,330

9 Claims. (Cl. 146—13)

This invention relates to a method of and apparatus for cracking nuts, and more particularly to a method and apparatus for cracking the shells of nuts such, for example, as walnuts, in order to separate the nut kernel in halves from the shell without crushing or smashing the nut kernel.

It is an object of this invention to provide a method of separating the shells from the kernels of nuts such, for example, as walnuts, pecans, or other similar nuts, so that the kernels are separated from the shells in halves.

It is an object of this invention to provide a method of separating halves of nuts from their shells, which method includes a progressive breaking or fracture of the shells without crushing, or liability of crushing, the kernels or meats of the nut wherein the nut shell is fractured or cracked longitudinally of the nut in a direction generally transversely to the web or connecting ridge of the halves of the nut shell, which fracture is started at one end of the nut and progressively completed at the opposed end thereof, and when the shell of the nut is fractured at a point or plurality of points transversely to the direction of the first fracture so that the shell of the nut is fractured into a plurality of portions over the halves so that the shell will fall away from, or be easily picked away from, the kernel of the nut, leaving the kernel in halves, and which method also contemplates the spreading of the shell portions during the fracture thereof with the result that the septum, or dividing fibrous partition between the halves of the nut kernel, is fractured or separated from the nut kernel halves so that it will easily separate from the halves of the nut kernel.

Another object of this invention is to provide an apparatus for cracking the shells of nuts, which means includes a pair of substantially complementary jaws which include progressive shell-fracturing means and a shell spreading means, and which jaws are mounted in an actuating mechanism in such a manner as to cause the same to be moved together in such way as to bring the progressive cracking and shell-spreading means into progressive operation.

Other objects and advantages of this invention it is believed will be apparent from the following detailed description of a preferred embodiment thereof as illustrated in the accompanying drawing.

In the drawing:

Figure 1 is a side elevation of the nut cracker embodying my invention illustrating the same in one form as adapted for hand operation.

Figure 2 is an enlarged plan view of one of the complementary cracking jaws taken substantially on the line 2—2 of Figure 1, the enlargement being to a size greater than the actual size for clarity of illustration.

Figure 3 is a sectional edge view taken substantially on the line 3—3 of Figure 2.

Figure 4 is a sectional elevation on a somewhat enlarged scale illustrating the operation of the nut-cracking apparatus embodying my invention and illustrating a walnut in dotted line positioned between the complementary jaws at the start of the cracking operation.

Figure 5 is a perspective view of a walnut illustrating the first step of the cracking operation of the shell.

Figure 6 is a similar perspective view of a walnut illustrating the second step of the cracking operation and method embodying my invention.

Figure 7 is a similar perspective view of the walnut illustrating the third or final step of the method of cracking the shells as embodied in my invention.

Figure 8 is a perspective view of the kernel of a walnut.

In the hereinafter set forth specific disclosure of my invention, I have chosen to illustrate and describe the same particularly with reference to the separation of the shell and halves of walnuts. However, my invention is not limited in its applicability to walnuts, or any particular nut, but is applicable to any of the common forms of nuts found on the market, it being in some cases applicable to these nuts only with a material variation in the sizes of the respective parts without change in their cooperative relationship or the method of separation of the shell from the kernel or meat halves.

As will be apparent in the accompanying drawing, a walnut includes an outer casing or shell after it has been cured and in the condition which it is found upon the market, separated from its enclosing husk. This shell is generally formed in two halves 1 and 2, which are separated by a connecting web or ridge 3 at which the said halves 1 and 2 are tenaciously held together. The kernel of the walnut, or the meat thereof, is formed in two halves which lie within the shell generally transversely of the web 3. This web or ridge 3 extends around the entire walnut from the bud end 4 to the stem end 5.

The kernel or meat of the walnut, and I am referring now particularly to English walnuts, is not truly formed in two halves, but is formed in two half-like portions which are connected or formed integrally together at the blossom end of the halves through the medium of a solid portion of the kernel meat generally indicated at 6. The two half-like portions of this kernel are separated and held in separated relation by means of a fibrous partition, or septum, 7 which is in many instances embedded within the half portions of the kernel or meat. In order to effect a clean separation of the halves of an English walnut, it is essential in many cases that this separating or dividing partition, or septum, be fractured, or the half-like portions of the kernel be spread and separated therefrom.

In accordance with the method embodying my invention, the walnut shell is cracked, or split, around the walnut from the bud to the stem end thereof in a progressive fracture. This fracture is made in a direction corresponding with the line of apparent division between the half-like portions of the kernel of the walnut substantially parallel with the septum 7 and transverse to the rib 3 of the shell.

As illustrated in Figure 5, the crack or fracture 8 is first formed at the bud end 4 of the nut, and generally extends substantially half-way around the shell of the nut toward the stem end. The fracture in this plane of the walnut is then completed by a corresponding fracture 9 beginning at the stem end 5 and meeting the fracture 8 formed from the bud end. This two-step operation completes the fracture in what might be termed the plane of the septum of the kernel. The fractures 8 and 9 having been completed and joined, the shell is spread in the fracture thus formed with the result of a tendency to separate the halves of the kernel and fracture the fibrous partition or septum 7, and likewise to spread the portions of the shell as thus formed from the nut kernel. The plane of division of the kernel of the nut coincides generally with the fracture thus formed so that the slight spreading of this fracture tends to fracture the portion 6 of the kernel by which the two half portions of the kernel are joined together.

The concluding steps of the process embodying my invention are to crack the shell at a single or plurality of points transverse to the plane of the longitudinal crack or fracture indicated at 8 and 9. The transverse fracture or fractures are formed at any point along the shell of the nut, but are preferably formed progressively as indicated in Figure 7 at the two ends of the nut shell, the progressive fractures being indicated at 10 and 11, it being immaterial which of these transverse fractures is formed first, and in some instances the fracture 10 will precede the formation of the fracture 11, and in some instances the reverse operation will be true. Also in some cases the transverse fracture will not correspond in location or in direction to either of the fracture lines 10 or 11.

The indication of the precise direction of the fractures as shown by the fractures 8, 9, 10 and 11 is a typical example and may not always proceed in precisely these directions. The fractures are, however, a longitudinal fracture generally in the plane of division between the halves of the kernel and a single or multiple fracture of the shell transverse to the direction of the said longitudinal fracture.

In order to carry out the method embodying my invention by hand, or through the medium of the hands, I have indicated an apparatus which is intended to be of a diagrammatic character wherein a pair of complementary jaws 12 and 13 are mounted upon, or are formed integral with, the jaws 14 and 15 of a plier mechanism. The jaws 14 and 15 are, in the form illustrated, formed integral with the handle levers 16 and 17 and the two handle levers are pivotally united together at a pivot 18. I have chosen this particular form of illustration as the simplest form of my invention which enables me to move the jaws 12 and 13 together in such manner as to carry out the method of formation of the progressively formed fractures. In the form of jaws 12 and 13 as illustrated, each jaw is provided with an initial fracture arc or rib 19, a secondary fracture or arc rib 20, which latter arc rib is provided with a spreader or spreading wedge 21. The two jaws 12 and 13 are generally arcuate in formation to partially embrace a walnut or nut, as indicated in Figure 4, so that the walnut is gripped between the complementary arc ribs 19 and 20. The formation of the ribs 19 and 20, as well as the formation of the body of the jaws 12 and 13, is roughened so as to increase the frictional grip of the jaws upon the shell of the nut.

The jaws 12 and 13 are curved and are so formed and actuated as to leave an opening between them when they are moved together. The shell of a nut possesses considerable resiliency. By curving the jaws 12 and 13 and leaving the opening extending between the jaws not only at the sides but also at the ends of the jaws when brought toward each other the shell, both as fractured and unfractured, may bulge outwardly at this opening.

In the operation of the apparatus as thus illustrated for carrying out the process embodying my invention, the walnut or other nut is mounted between the jaws 12 and 13 with the blossom end 4 projected inwardly in the plier mechanism toward, and so as to be gripped between, the complementary arc ridges 19 with the plane of suture of the walnut determined by the rib 3 generally parallel to the jaws 14 and 15. The operator then actuates the lever handles 16 and 17, forcing the same toward each other, with the result that the preliminary fracture 8 is formed by moving the arc ribs 19 toward each other against the shell of the walnut. Continued pressure brings the two arc ribs 20 against the shell of the walnut forming the fracture 9 and forcing the two complementary spreaders 21 into the fracture formed to spread the fractured shell. Continued pressure upon the plier handles results in the formation of the transverse fracture or fractures 10 and 11, thus completing the operation of fracturing the shell of the walnut so that when the same is taken from between the jaws, the portions of the shell will drop away from the kernel, or may be picked away from the walnut leaving the kernel whole or in two halves.

It will be obvious from the foregoing that the particular illustration of apparatus which I have made is only diagrammatic in character and that the jaws 12 and 13 may be mounted in any other suitable form of apparatus whereby said jaws will be actuated toward each other in such manner as will cause the formation of the longitudinal fracture with the subsequent formation of the transverse fracture and the resulting spreading of the shell sections. The shell of the nut is held in the cracking operation between the ribs 19 and 20 as the progressive fracture proceeds and is held from bedding, i. e., contacting throughout or over a major portion of its periphery with the body of the jaws. This allows me to take advantage of the resiliency of the nut shells and to cause the shells to bulge outwardly both at the ends and sides of the nut, causing the end fracture of the shell as indicated at 10 and 11, and also resulting in the bulging of the nut shell sections outwardly and away from each other at the fracture 8, 9 whereby the two half sections of the nut kernel are separated or spread apart and spread away from the septum 7.

An adjustable stop may be interposed between the members used for actuating the jaws 12 and 13 to arrest the approach of the jaws toward each other and prevent crushing of the nut kernel. This may be particularly advantageous in machine operation. In hand operation it is not necessary but an aid to speed cracking when the nuts are fairly uniform in size. Any desirable form of stops may be used, such, for example, as the stop-pin 25 adjustably threaded to one lever 17 in position to engage the stop boss 26 carried by the opposed lever 16. The pin 25 may be locked in adjusted position by means of a lock nut 27.

Having fully described by invention, it is to be understood that I do not wish to be limited to the details herein set forth, but my invention is of the full scope of the appended claims.

I claim:

1. A nut cracking device comprising a pair of members pivotally connected together at a point intermediate their ends to provide handle portions and nut gripping jaws on opposite sides respectively of the pivotal connection, said nut gripping jaws being arranged in confronting relation and curved transversely to enable the same to substantially embrace the shell of a nut, each of the adjacent curved surfaces of said jaws being provided with a transverse arcuate preliminary gripping ridge projecting therefrom for a substantial height at a point near said pivotal connection and a generally similar secondary transverse arcuate gripping ridge adjacent the outermost extremity of said jaws, whereby when a nut is placed between said jaws and pressure is applied to said handle members said jaws will move toward each other to progressively cause said preliminary and secondary gripping ridges to engage the shell of said nut and crack the same.

2. A nut cracking device comprising two concave nut gripping jaws in confronting relation, each of the concave surfaces of said jaws being provided with a transverse arcuate preliminary gripping ridge and a generally similar secondary transverse arcuate gripping ridge spaced from but substantially parallel to said preliminary gripping ridges, each of said secondary gripping ridges having a spreading member arranged substantially medially of its length; means supporting said jaws at an angle with respect to each other so that when said jaws approach each other the preliminary arcuate gripping ridges are the first to contact the shell of the nut to be cracked; and means for moving at least one of said jaws so that the distance between the jaws may be lessened at will, after the nut to be cracked has been placed between said jaws.

3. A nut cracking device comprising a pair of nut gripping jaws pivoted together in confronting relation, each of the adjacent surfaces of said jaws being provided with a transverse arcuate preliminary gripping ridge projecting therefrom for a substantial height at one end thereof adjacent to said pivotal connection and a generally similar secondary transverse arcuate gripping ridge adjacent the opposite end of said jaws, and means for causing at least one of said jaws to move toward the other.

4. A nut cracking device comprising a pair of nut gripping jaws in confronting relation, each of the adjacent surfaces of said jaws being provided with a transverse arcuate preliminary gripping ridge projecting therefrom for a substantial height at one end thereof and a generally similar secondary transverse arcuate gripping ridge adjacent the opposite end of said jaws, and means for moving at least one of said jaws toward the other.

5. A nut cracking device comprising a pair of members pivotally connected together at a point intermediate their ends to provide handle portions and nut gripping jaws on opposite sides respectively of the pivotal connection, said nut gripping jaws being arranged in confronting relation, each of the adjacent surfaces of said jaws being provided with a transverse arcuate preliminary gripping ridge projecting therefrom for a substantial height at a point near said pivotal connection and a generally similar secondary transverse arcuate gripping ridge adjacent the outermost extremity of said jaws, whereby when a nut is placed between said jaws and pressure is applied to said handle members said jaws will move toward each other to progressively cause said preliminary and secondary ridges to engage the shell of said nut and crack the same.

6. A nut cracking device comprising a pair of members pivotally connected together at a point intermediate their ends to provide handle portions and nut gripping jaws on opposite sides respectively of the pivotal connection, said nut gripping jaws being arranged in confronting relation, each of the adjacent surfaces of said jaws being provided with a transverse arcuate preliminary gripping ridge projecting therefrom for a substantial height at a point near said pivotal connection and a generally similar secondary transverse arcuate gripping ridge adjacent the outermost extremity of said jaws, and a spreading member associated with each of said secondary ridges.

7. A nut cracking device comprising a pair of members pivotally connected together at a point intermediate their ends to provide handle portions and nut gripping jaws on opposite sides respectively of the pivotal connection, said nut gripping jaws being arranged in confronting relation, each of the adjacent surfaces of said jaws being provided with a transverse arcuate preliminary gripping ridge projecting therefrom for a substantial height at a point near said pivotal connection and a generally similar secondary transverse arcuate gripping ridge adjacent the outermost extremity of said jaws, and means for limiting the extent of movement of said jaws toward each other.

8. A method of cracking the shell of a nut containing kernel halves separated by a septum, including the steps of: applying pressure to the exterior of said shell adjacent one end thereof in a direction transversely of the shell to form a preliminary crack in said end of said shell extending longitudinally thereof in a direction substantially parallel with the plane of the septum between the kernel halves; applying a similar pressure to said shell adjacent the opposite end thereof to form another longitudinal crack merging with said preliminary crack to thereby provide a continuous longitudinal crack around the shell; and continuing the application of pressure transversely of the shell adjacent the ends thereof to form one or more cracks in said shell extending transversely from said continuous longitudinal crack.

9. A method of cracking the shell of a nut containing kernel halves separated by a septum, including the steps of: applying pressure to the exterior of said shell adjacent one end thereof in a direction transversely of the shell to form a preliminary crack in said end of said shell extending longitudinally thereof in a direction substantially parallel with the plane of the septum between the kernel halves; applying a similar pressure to said shell adjacent the opposite end thereof to form another longitudinal crack merging with said preliminary crack to thereby provide a continuous longitudinal crack around the shell; and continuing the application of pressure transversely of the shell adjacent the ends thereof to form one or more cracks in said shell extending transversely from said continuous longitudinal crack and substantially simultaneously spreading said shell apart along said continuous longitudinal crack.

WILLIAM O. GANTZ.